US011724231B1

(12) United States Patent
Koppenhoefer et al.

(10) Patent No.: US 11,724,231 B1
(45) Date of Patent: Aug. 15, 2023

(54) PORTABLE REVERSE OSMOSIS SYSTEM

(71) Applicant: Spot Zero Reverse Osmosis Inc., Fort Lauderdale, FL (US)

(72) Inventors: Benjamin J. Koppenhoefer, Fort Lauderdale, FL (US); Jeffrey Alan Johnson, Pahokee, FL (US); Jake Zale Dudas, Fort Lauderdale, FL (US); Chad Edward Sullivan Tucker, Oakland Park, FL (US)

( * ) Notice: Subject to any disclaimer, the term of this patent is extended or adjusted under 35 U.S.C. 154(b) by 0 days.

(21) Appl. No.: 18/100,436

(22) Filed: Jan. 23, 2023

(51) Int. Cl.
| | |
|---|---|
| B01D 61/02 | (2006.01) |
| B01D 61/04 | (2006.01) |
| B01D 61/08 | (2006.01) |
| C02F 1/00 | (2023.01) |
| C02F 1/44 | (2023.01) |

(52) U.S. Cl.
CPC ........... B01D 61/026 (2022.08); B01D 61/04 (2013.01); B01D 61/08 (2013.01); C02F 1/002 (2013.01); C02F 1/441 (2013.01); *B01D 2311/04* (2013.01); *B01D 2313/243* (2013.01); *B01D 2317/02* (2013.01); *C02F 2201/002* (2013.01); *C02F 2301/08* (2013.01)

(58) Field of Classification Search
CPC .......... B01D 2313/243; B01D 2317/02; C02F 1/002; C02F 1/441; C02F 2201/002
See application file for complete search history.

(56) References Cited

U.S. PATENT DOCUMENTS

| | | | |
|---|---|---|---|
| 2020/0140307 A1 * | 5/2020 | Dow | .................... B01D 61/025 |
| 2022/0185652 A1 | 6/2022 | Park et al. | |

FOREIGN PATENT DOCUMENTS

| | | | | |
|---|---|---|---|---|
| CN | 1948169 A | * | 4/2007 | |
| CN | 103193332 A | * | 7/2013 | |
| CN | 204848487 U | | 12/2015 | |
| CN | 107098495 A | | 8/2017 | |
| CN | 207253892 U | | 4/2018 | |
| CN | 105836908 B | * | 3/2019 | ............... C02F 9/00 |
| CN | 111977750 A | | 11/2020 | |
| CN | 212174606 U | | 12/2020 | |
| CN | 212174607 U | | 12/2020 | |
| CN | 213085626 U | | 4/2021 | |
| CN | 213202578 U | | 5/2021 | |
| FR | 2732727 A1 | * | 10/1996 | ............. B01D 61/06 |

OTHER PUBLICATIONS

Magnoler M—FR-2732727-A1 machine translation (Year: 1996).*

(Continued)

*Primary Examiner* — Bradley R Spies

(74) *Attorney, Agent, or Firm* — Derek Fahey, Esq.; The IP Plus Firm, PLLC

(57) ABSTRACT

A reverse osmosis system to be connected to a feed water conduit and producing permeate water is disclosed. The reverse osmosis system includes a plurality of tubular bodies each having a first end and a second end, a first inner end plate attached to the first end of the tubular bodies, and a second inner end plate attached to the second end of the tubular bodies. The plurality of tubular bodies houses a filter, a pump, and two reverse osmosis membranes therein. The plurality of tubular bodies is configured to be connected in in fluid communication with each other via channels disposed within the end plates.

18 Claims, 9 Drawing Sheets

(56) References Cited

OTHER PUBLICATIONS

Chen Y—CN-1948169-A machine translation (Year: 2007).*
Zou G—CN-105836908-B machine translation (Year: 2019).*
Tang W—CN-103193332-A machine translation (Year: 2013).*
Filterpur Environmental Protection Technology Co., Ltd., Home water filter 4 stages Direct drinkng water filter 400G 600G, website: https://www.filterpur.com/home-water-filter-4-stages-direct-drinkng-water-filter-400g-600g-2-product/.

* cited by examiner

PORTABLE REVERSE OSMOSIS SYSTEM

CROSS-REFERENCE TO RELATED APPLICATIONS

Not applicable.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISC

Not applicable.

TECHNICAL FIELD

The present disclosure relates to the field of water purification, and more specifically to the field of water purification using reverse osmosis systems.

BACKGROUND

Reverse osmosis is a process for removing dissolved mineral salts, organic molecules, and certain other impurities by forcing water under pressure to pass through a semi-permeable membrane. The reverse osmosis process reverses the natural osmotic effect in which fluids with a low concentration of dissolved solids pass through a membrane into an area of higher concentration. With reverse osmosis, water is made to pass from a state of high concentration to a state of low concentration. Reverse osmosis is used to produce highly purified water for drinking water systems, industrial boilers, food and beverage processing, cosmetics, pharmaceutical production, seawater desalination, and many other applications.

Today, reverse osmosis filtration systems include other filtration types. Some reverse osmosis systems use a series of tubes to minimize space. Some reverse osmosis filtration systems may include a sediment filter, a carbon filter, and/or a semi-permeable membrane. The sediment filter and carbon filter may be essential in reverse osmosis systems because they remove particles that would obstruct or damage a reverse osmosis membrane. Some filtration systems may use tubes or conduits to connect each filter in a certain order. In some cases, reverse osmosis systems are large and may take up a lot of space, which can be very inconvenient and not practical. For example, boats and other vessels use water filtration systems that use up a lot of space Smaller boats have limited space and may not be able to hold standard filtration systems. Some of the prior art has attempted to resolve this problem by creating a smaller reverse osmosis system with a bundle of tubes that house the reverse osmosis system components.

However, the prior art does not provide protection for certain exposed conduits in reverse osmosis systems. The exposed conduits can leak or be easily damaged, especially in a moving boat. The exposed conduits of a filtration system in a rocking boat can become shifted or hit by other moving objects. Additionally, exposed conduits or tubes can make it much more difficult to access the components of the reverse osmosis system, which increases the cost to the consumer and can be a waste of time and resources. As a result, there exists a need for improvements over the prior art and more particularly for a more efficient way of providing a better compact reverse osmosis system.

SUMMARY

A reverse osmosis system and method to be connected to a feed water conduit and producing permeate water is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a reverse osmosis system to be connected to a feed water conduit and producing permeate water is disclosed. The permeate water exits the reverse osmosis system through a permeate water egress opening. The reverse osmosis system comprises a plurality of tubular bodies each having a first end and a second end, a first inner end plate attached to the first end of the tubular bodies, and a second inner end plate attached to the second end of the tubular bodies. The reverse osmosis system further comprises increases a first outer end plate removably attached to and abutting an outer surface of the first inner end plate and a second outer end plate removably attached to and abutting an outer surface of the second inner end plate. The reverse osmosis system further comprises an inner end plate pass-through opening disposed on first inner end plate such that the inner end plate pass-through opening is concentric with and in fluid communication with either the first end or second end of a first tubular body of the plurality of tubular bodies. The reverse osmosis system further comprises a first channel embedded within either the second inner end plate or second outer end plate. The first channel provides fluid communication between the first tubular body and a second tubular body of the plurality of tubular bodies. No conduit extending from an outward facing surface of first outer end plate and an outward facing surface of the second outer end plate provides fluid communication between the plurality of tubular bodies. No conduit extending from an outward facing surface of first inner end plate and an outward facing surface of the second inner end plate provides fluid communication between the plurality of tubular bodies. The reverse osmosis system further comprises at least one rod connecting the first inner end plate to second inner end plate. The plurality of tubular bodies houses a filter, a pump, and two reverse osmosis membranes therein. The plurality of tubular bodies is configured to be connected in series and to be in fluid communication with each other.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the disclosure and together with the description, explain the principles of the disclosed embodiments. The embodiments illustrated herein are presently preferred, it being understood, however, that the disclosure is not limited to the precise arrangements and instrumentalities shown, wherein:

Like reference numerals refer to like parts throughout the various views of the drawings. FIGS. 1 through 8 are drawn to scale for clarity and enablement of the present disclosure.

DETAILED DESCRIPTION

Figure 1:
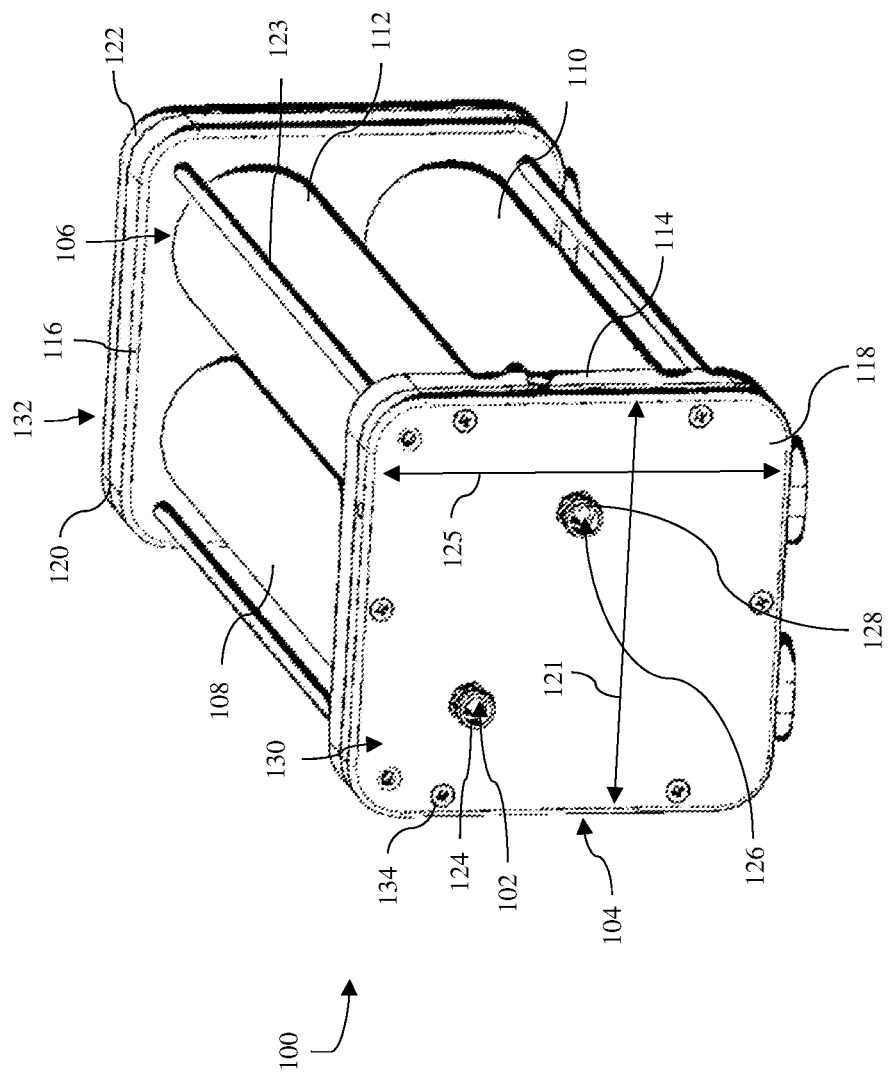
FIG. 1 is a front perspective view of a reverse osmosis system to be connected to a feed water conduit and producing permeate water, according to an example embodiment.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions, or modifications may be made to the elements illustrated in the drawings, and the methods described herein may be modified by substituting reordering or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing a compact, portable reverse osmosis system to be connected to a feed water conduit and producing permeate water. The reverse osmosis system is compact because there are no conduits providing fluid communication between the tubular bodies, or tubes, that are exposed on or extruding from the inner end plates or outer end plates. The conduits providing fluid communication to the tubular bodies are internal channels that are enclosed within the end plates. The inner end plates allow the internal channels to provide fluid communication between the tubular bodies without the need for external conduits to attach to the tubular bodies. The channels or pathways are embedded and span inside the end plates to provide fluid communication between each tubular body of the system. The inner end plates provide access to one side for each of the tubes, thereby reducing the risk of damage to or leaking of the tubes. This improves the life expectancy of the components of the system, improves the repairability and reparability of the system, and allows for more efficient and timelier maintenance because disassembly of the system is not required. Rather, a user needs only to remove the outer end plate to access the components of the system.

By alternating the tubular bodies between the end plates, channels can be provided within the end plates to allow fluid communication between the tubular bodies rather than having external conduits connecting the components of the system. This allows the tubular bodies to be compactly disposed between the bounds of the end plates.

Additionally, the system is portable by including modular attachments for the main conduits, such as conduits for feed water, permeate water, and concentrate water. Because the attachments are constructed using standardized units and dimensions for flexibility and variety in use, the system is installable and adaptable in existing systems.

Referring now to the Figures, FIG. 1 is a front perspective view of a reverse osmosis system 100 to be connected to a feed water conduit (202 shown in FIG. 2) and producing permeate water, according to an example embodiment. The permeate water exits the reverse osmosis system through a permeate water egress opening 126. The permeate water, also known as product water, in a reverse osmosis system is water that has passed through a reverse osmosis membrane. The reverse osmosis system includes a plurality of tubular bodies (first tubular body 108, third tubular body 110, fourth tubular body 112 shown in FIG. 1 and second tubular body 420 shown in FIG. 4) each having a respective first end 104 and a respective second end 106. The first end 104 is more clearly shown in FIG. 3 and FIG. 4. The plurality of tubular bodies is configured to house a filter, a pump, and two reverse osmosis membranes therein. It is understood that, in certain embodiments, each tubular body may be configured to house at least one of the filter, pump, and reverse osmosis membranes. Each of the tubular bodies is hollow, cylindrical prism configured to house components of the system. It is understood that the tubular bodies are not limited to cylindrical prisms but rather may be any elongated hollow geometric prism, such as those having cross-sectional shapes being rectangular, triangular, hexagonal, or other polygons, irregular or regular, and any combination thereof configured to enclose the components of the system. In other words, the cross-sectional shapes of the channels embedded within the end plates may have a variety of different shapes that are within the spirit and scope of the present invention. A first inner end plate 114 is attached to the first end 104 of the tubular bodies. A second inner end plate 116 is attached to the second end 106 of the tubular bodies.

In a first embodiment, each of the tubular bodies may have at least one open end configured to allow the tubular body to receive the components of the system. For example, the first tubular body and the third tubular body may have an open-end portion in attachment with the first inner end plate and the fourth tubular body has an open-end portion in attachment with the second inner end plate. In other embodiments, each end of the tubular body may be closed and have at least one opening to provide fluid communication to at least one inside portion of a respective end plate. In one embodiment, the system improves over the prior art by alternating open ends of the tubular bodies as the system progresses, for example, the third tubular body may have an open end in attachment with the first inner end plate and the fourth tubular body may have an open end in attachment with the second inner end plate. This allows alternation of respective ingresses and egresses of the reverse osmosis membranes for example. The alternation of the tubular bodies as connected to the inner end plates allows the end plates to comprise pathways or channels that provide fluid communication between the tubular bodies. This eliminates the need for external conduits for providing fluid communication between the tubular bodies.

Figure 9:
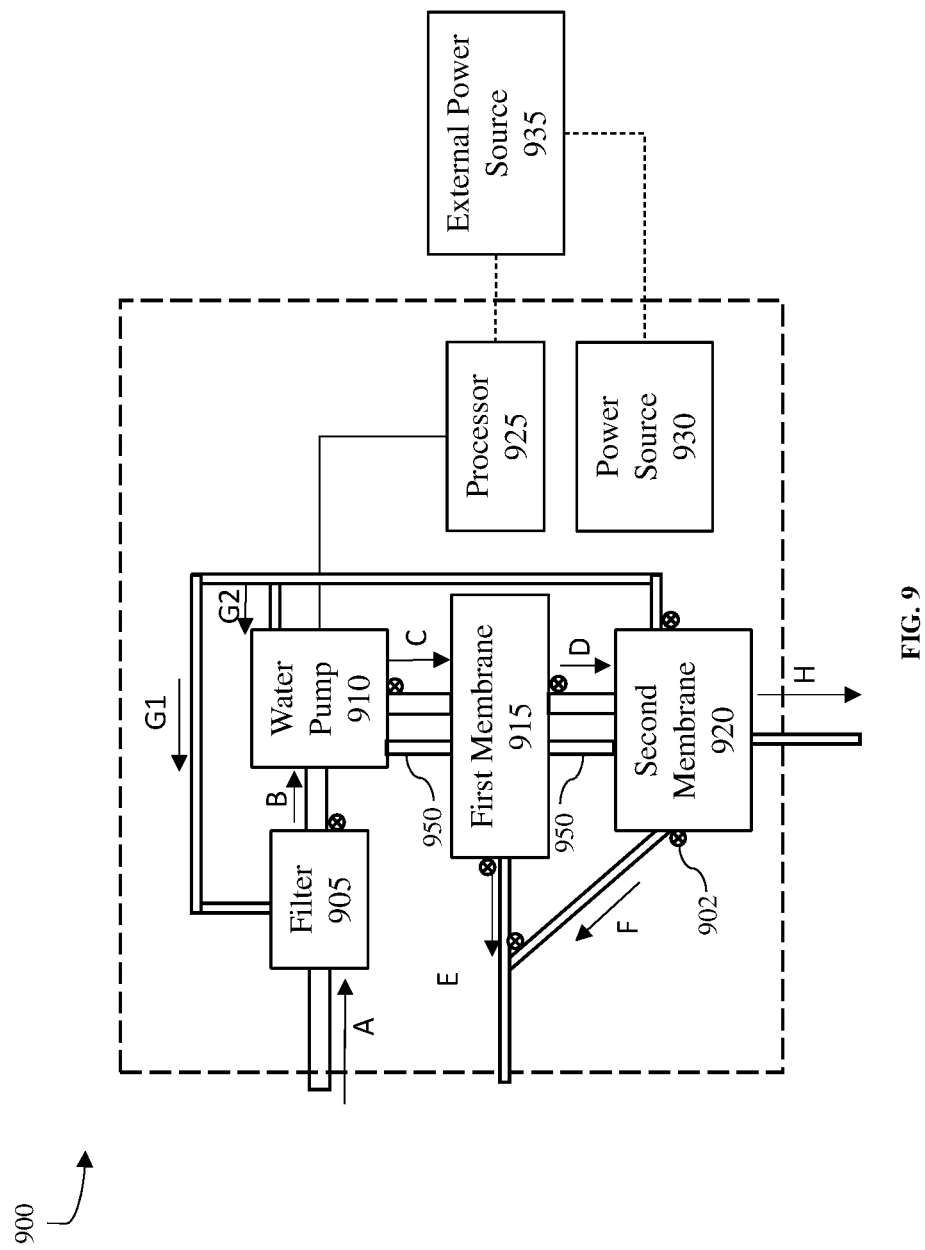
FIG. 9 is a diagram illustrating the waterflow in the reverse osmosis system, according to an example embodiment.

In one example embodiment, a first tubular body 108 houses the filter (905 in FIG. 9), and a second tubular body (420 in FIG. 4) houses the pump (910 in FIG. 9). A third tubular body 110 houses a first reverse osmosis membrane (915 in FIG. 9), and a fourth tubular body 112 houses a second reverse osmosis membrane (920 in FIG. 9). In one embodiment, the reverse osmosis membrane is semi-permeable to water molecules thereby trapping solutes from permeating the membrane thus creating permeate water, or water that has been desalinated, demineralized, and/or deionized. The pump may be a high-pressure water pump configured to force feed water and/or filtered feed water across the reverse osmosis membrane. The concentrate water is water that comprises high concentrations of solutes that did not permeate the membranes. Such concentrate water may be expelled from the system through the concentrate egress conduit (206 in FIG. 2) and/or recycled through the system through the fourth channel (510 and 511 in FIG. 5), in certain embodiments. However, it is understood that the concentrate water may be expelled from the system in other locations that are within the spirit and scope of the present invention.

The plurality of tubular bodies is configured to be connected in series and to be in fluid communication with each other to create a compact and modular reverse osmosis system. Connected in series means that the connection between the tubular bodies creates a single path of the waterflow to flow from at least one tubular body to the next tubular body. However, in some embodiments, the path of the waterflow may have branching pathways that lead to the permeate water egress pass through to be expelled from the system through the egress permeate water egress conduit (204 in FIG. 2) and/or to an additional tubular body. For example, in a first embodiments, a tubular body may be in fluid communication with at least one tubular body via at least one pass-through channel. In a second embodiment, a tubular body may be in fluid communication with at least two tubular bodies via at least one pass through channel. In a third embodiment, a tubular body may be in fluid communication with at least three tubular bodies via at least one pass through channel. The pass-through channel is an opening within the end plate joining two areas within the inner end plate such to provide fluid communication between at least two tubular bodies. Therefore, this system improves upon the prior art by providing pass through channels to subsequent elements of a reverse osmosis system within a single end plate, thereby creating a modular and compact system to improve portability, workability, maintenance, and repair of the system.

In some embodiments, the conduits may be configured to connect the tubular bodies in parallel. In addition to the channels in the present invention, a system including tubular bodies in parallel fluid communication may include channels configured to maintain constant water flow if one of the tubular bodies are removed. In parallel fluid communication, each tubular body may be in direct fluid communication with at least three other tubular bodies. For example, in addition to the channels in the present invention, there may be a sixth channel 950 (as shown as in FIG. 9) that provides fluid communication between the second tubular body and the forth tubular bodies. Feed water from the filter may flow through the sixth channel into each of the first reverse osmosis membrane and second reverse osmosis membrane. Parallel fluid communication would allow the flow of water filtration to continue if a component, such as the water pump, water filter, and reverse osmosis membranes, in the tubular bodies is damaged or obstructed because it would provide alternative pathways for waterflow. In some embodiments of the tubular bodies having parallel fluid communication, the user of the system may be able perform maintenance on at least one of the tubular bodies without turning off the system.

A first outer end plate 118 removably is attached to and abuts an outer surface (810 in FIG. 8) of the first inner end plate at an abutting section 120. The outer end plate is removably attached such that it can be separated from the system to provide access to the inner end plate and/or tubular bodies for repair and/or maintenance of the system. A second outer end plate 122 removably is attached to and abuts an outer surface (425 in FIG. 4) of the second inner end plate at an abutting section 120. The abutting section is the common boundary where the respective inner end plate and outer end plate abut or contact each other. The outer end plates may be removably attached to the respective inner end plates via a plurality of fasteners 325. Each of the fasteners may include hooks, bolts, set crews, openings configured to attached to protruding elements (such as a latch), socket screws, U-bolts, twine, etc. However, other types of fasteners may also be used and are within the spirit and scope of the present invention.

The inner end plates may be comprised of metallic material such as carbon steel, stainless steel, aluminum, Titanium, other metals or alloys, composites, ceramics, polymeric materials such as polycarbonates, such as Acrylonitrile butadiene styrene (ABS plastic), Lexan™, and Makrolon™, or other materials having waterproof type properties. The inner end plates may be made of other materials and is within the spirit and scope of the disclosure. The inner end plates may be formed from a single piece or from several individual pieces joined or coupled together. The components of the inner end plates may be manufactured from a variety of different processes including an extrusion process, a mold, casting, welding, shearing, punching, folding, 3D printing, CNC machining, etc. However, other types of processes may also be used and are within the spirit and scope of the present invention.

The outer end plates may be comprised of metallic material such as carbon steel, stainless steel, aluminum, Titanium, other metals or alloys, composites, ceramics, polymeric materials such as polycarbonates, such as Acrylonitrile butadiene styrene (ABS plastic), Lexan™, and Makrolon™, or other materials having waterproof type properties. The outer end plates may be made of other materials and is within the spirit and of the disclosure. The outer end plates may be formed from a single piece or from several individual pieces joined or coupled together. The components of the outer end plates may be manufactured from a variety of different processes including an extrusion process, a mold, casting, welding, shearing, punching, folding, 3D printing, CNC machining, etc. However, other types of processes may also be used and are within the spirit and scope of the present invention.

The end plates on each side of the system are parallel to each other. Additionally, each end plate is perpendicular to the longitudinal axis of the plurality of tubular bodies. The surfaces of the end plates are substantially flat to conserve space. The inner end plates have dimensions including a length 121, a width (820 in FIG. 8), and a height 125. In the present embodiment, the length is approximately 11.75-inches. The width is approximately 1.5-inches. The height is approximately 11.75-inches. The outer end plates have dimensions including the length 121, a second width (830 in FIG. 8), and the height 125. In the present embodiment, the second length is approximately 11.75-inches. The second width is approximately 1-inch. The second height is approximately 11.75-inches. In other embodiments, other dimensions may be used and are within the spirit and scope of the present invention. However, in other embodiments different dimensions may be used and are within the spirit and scope of the present invention. In other embodiments, different measurements may be used to scale with different sizes of filters, water pumps, and reverse osmosis membranes.

At least one rod 123 connects the first inner end plate to the second inner end plate to secure the plurality of tubular bodies between the end plates. However, in other embodiments, multiple rods may be used to connect each of the inner end plates. Because the end plates are perpendicular the tubular bodies, the connecting rod(s) are parallel to the tubular bodies. The rod may be comprised of metallic material such as carbon steel, stainless steel, aluminum, Titanium, other metals or alloys, composites, ceramics, polymeric materials such as polycarbonates, such as Acrylonitrile butadiene styrene (ABS plastic), Lexan™, and Makrolon™, or other materials having waterproof type properties. The rod may be made of other materials and is within the spirit and of the disclosure. The rod may be formed from a single piece or from several individual pieces joined or coupled together. The components of the rod may be manufactured from a variety of different processes including an extrusion process, a mold, casting, welding, shearing, punching, folding, 3D printing, CNC machining, etc. However, other types of processes may also be used and are within the spirit and scope of the present invention.

The ingress pass-through opening 102, disposed on the first outer end plate and first inner end plate, is configured to be connected to the feed water conduit (202 in FIG. 2) via a feed water ingress attachment 124, and in fluid communication with the first end of the water filter disposed within the first tubular body 108 of the plurality of tubular bodies. The feed water ingress attachment may include threads so that the feed water conduct may be in fluid communication with the water filter. The water filter may be an activated carbon filter. In some embodiments, the filter may include a sediment filter. The water filter is configured to remove chemicals or particles that would obstruct or damage a reverse osmosis membrane. In other embodiments, the water filter may include other types of filters configured to remove particles in water that would harm or obstruct a reverse osmosis membrane.

The reverse osmosis membranes are configured to allow certain solutes or no solutes to pass through the membrane to produce permeate or clean water. The first reverse osmosis membrane and the second reverse osmosis membrane may be rolled fiberglass reverse osmosis membranes. Other reverse osmosis membranes are within the spirit and scope of the present invention.

The permeate water exits the reverse osmosis system through a permeate water egress opening 126 that is configured to be in fluid communication with a permeate water conduit (204 in FIG. 2) via a permeate water egress attachment 128. Shown in FIG. 5, a concentrate water egress opening 520, disposed on an inner surface (825 in FIG. 8) of the first inner end plate, is configured to be connected to a concentrate water conduit (206 in FIG. 2) via a concentrate water egress attachment (208 in FIG. 2). For example, in a water vessel such as a boat or yacht, the concentrate water conduit flows excess concentrate water overboard to be disposed of. Concentrate water is generally unsafe for drinking and is removed from the system. The feed water ingress attachment 124, the permeate water egress attachment 126, and the concentrate water egress attachment (208 in FIG. 2) may include threaded portion to attach to a threaded nozzle of a hose or other type of conduit. In other embodiments, the attachments may be friction fit, snap fit, force fit, and other types of attachments to secure the external conduits to the end plate.

Figure 4:
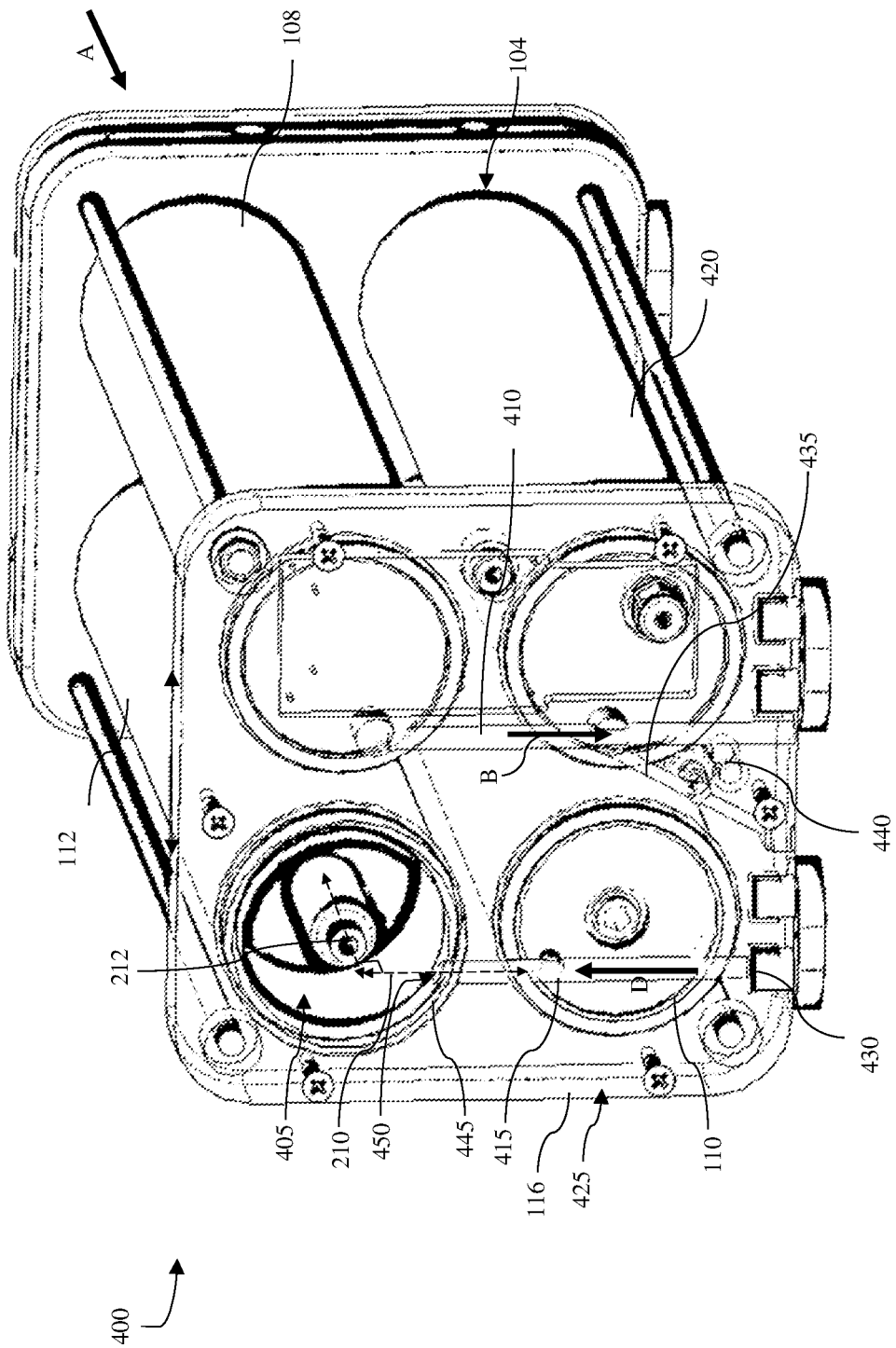
FIG. 4 is a back perspective view of the reverse osmosis system having an outer end plate removed with the inner plate being transparent illustrating certain channels within the inner plate, according to an example embodiment.
Figure 5:
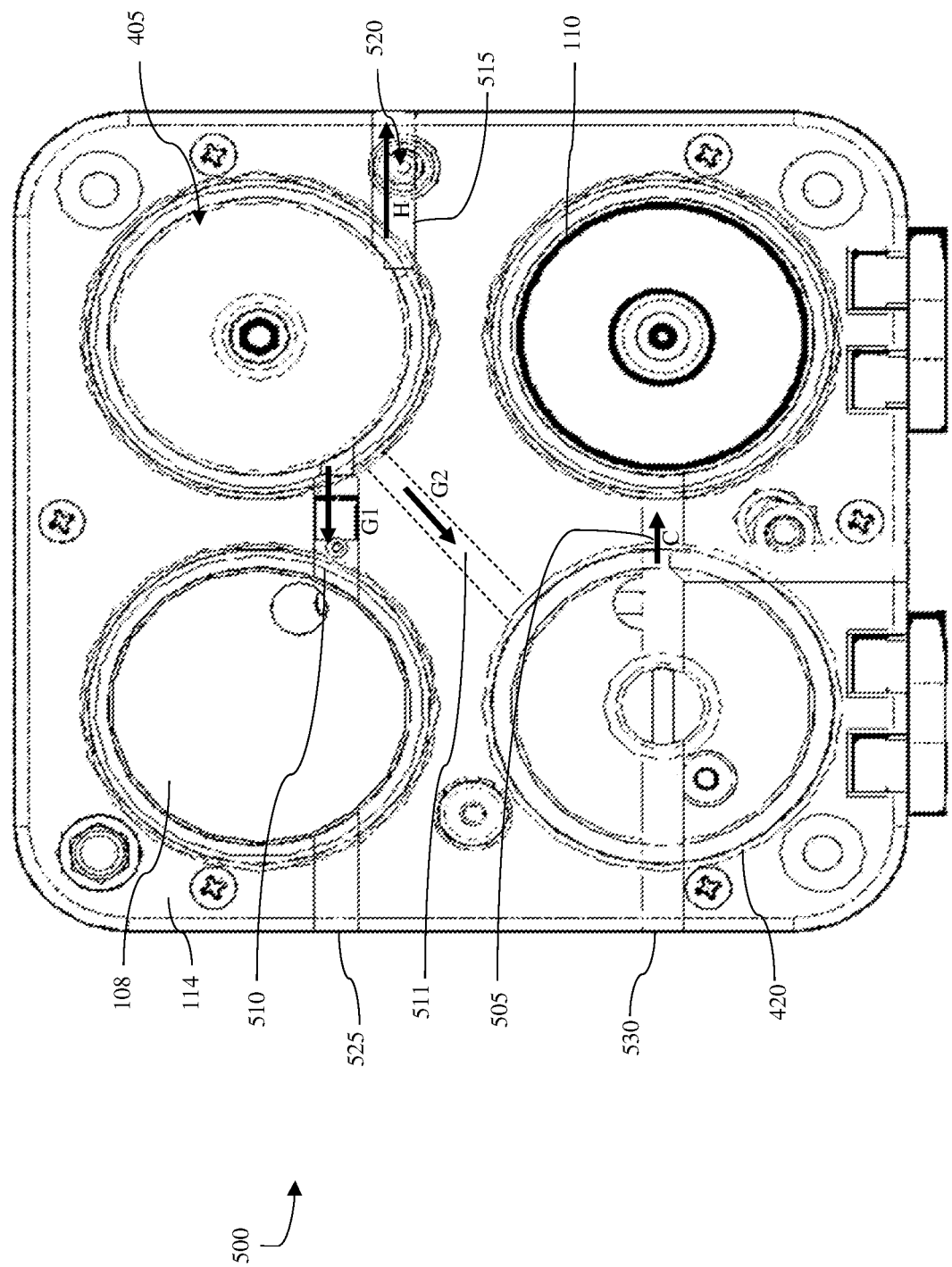
FIG. 5 is a front view of the reverse osmosis system to be connected to a feed water conduit and producing permeate water, illustrating certain channels within the inner end plate, according to an example embodiment.

A first channel (410 in FIG. 4), bored within the second inner end plate, provides fluid communication between the water filter disposed within the first tubular body and a water pump disposed within a second tubular body of the plurality of tubular bodies. In one embodiment, the radius of the first channel is approximately 0.219-inches, and the length of the first channel is approximately 4.5-inches. The water pump is a motor pump that directs the flow of water towards one direction. Other types of water pumps configured to direct the flow of water in one direction may be used and are within the spirit and scope of the present invention. A second channel 505 (as illustrated in FIG. 5), bored and embedded within the first inner end plate, provides fluid communication between the water pump disposed within second tubular body and a first reverse osmosis membrane disposed within a third tubular body of the plurality of tubular bodies. The radius of the second channel is approximately 0.281-inches, and the length of the second channel is approximately 2.75-inches. A third channel 415 (as illustrated in FIG. 4), bored and embedded within the second inner end plate, provides fluid communication between the first reverse osmosis membrane disposed within the third tubular body and a second reverse osmosis membrane disposed within a fourth tubular body of the plurality of tubular bodies. The radius of the third channel is approximately 0.219-inches, and the length of the third channel is approximately 2.13-inches. As water passes through the reverse osmosis membranes, the membranes produce permeate water or filtered water. A permeate water egress pass though opening 126, bored on the first inner end plate and extending through the first outer end plate, is configured to be connected to the permeate water pass through egress conduit (204 in FIG. 2). A fourth channel 510 (illustrated in FIG. 5) is bored within the first inner end plate and is a pathway to provides fluid communication between the second reverse osmosis membrane disposed within the fourth tubular body and the water filter disposed within the first tubular body. Alternatively, the fourth channel may be a pathway 511 embedded within the second inner end plate that provides fluid communication between the second reverse osmosis membrane disposed within the fourth tubular body and the pump disposed with the second tubular body. The radius of the fourth channel is approximately 0.2953-inches, and the length of the fourth channel is approximately 1.6-inches. Further described below with reference to FIG. 6 and FIG. 7, a fifth channel 605 is bored and embedded within the first outer end plate and provides fluid communication between a permeate water outlet of the first reverse osmosis membrane and a permeate water outlet of the second reverse osmosis membrane disposed within the third tubular body. The radius of the fifth channel is approximately 0.219-inches, and the length of the fifth channel is approximately 5.3-inches. It is understood that the sizes of the channels are not limited to the stated measurements. In other embodiments, different measurements may be used for preferred water flow speeds and pressures and are within the spirit and scope of the present invention.

Generally, the channels are pathways within the endplates for providing fluid communication between the tubular bodies between the endplates. Additionally, the channels may be pathways within the end plates that provide fluid communication from a tubular body to an ingress or egress in attachment with an external conduit (such as the feed water conduit, permeate water conduit, and/or concentrate water conduit). In a first embodiments, the channels may be bored during or after the manufacturing processes of the inner end plates. In a second embodiment, the channels may be conduits, such as piping, housed within the endplates where the conduits do not extend from the inner and/or outer surfaces of the end plates.

In the first embodiment, the channels are bored such that it is a hollow passageway within the inner end plates. Each of the tubular bodies have openings that connect to the openings of certain channels. For example, shown in FIG. 4, the third channel 415 traverses through second inner end plate to provide an opening 450 on the perimeter edge 445 of the tubular opening 405. Shown in FIG. 3, the channels may end before the perimeter edge 320 of the inner end plates. The channels within the end plates are pathways that provide a fluid connection in series between the tubular bodies. The channels are bored such that the longitudinal axis 210 of the channels are substantially perpendicular relative to the longitudinal axis 212 of plurality of tubular bodies. The channels between each of the plurality of tubular bodies improve over the prior art because they are enclosed and embedded within the end plates and do not have plumbing that extend to the outside surfaces of the end plates. This allows the system to be compact and smaller in comparison to the prior art. Because the channels span within the end plates, the longitudinal axis of the channels are perpendicular to the longitudinal axis of the tubular bodies. The channels do not extend or protrude from the system.

The channels allow water (feed, permeate, and/or concentrate water respectively) to flow within the system to each stage of the reverse osmosis system without the need for an external conduit to attach directly to a tubular body. In other words, no conduit extending from an outward facing surface (315 in FIG. 3) of first inner end plate and no conduit extending from an outward facing surface (425 in FIG. 4) of the second inner end plate provides fluid communication between the plurality of tubular bodies. The external conduits, such as the feed water conduit, the permeate water conduit, and the concentrate water conduit are directly in fluid communication with the end plates and do not directly attach to any tubular body. All fluid communication between the tubular bodies flows within the end plates, thereby eliminating external connections between them. When a tubular body is required to expel water from the system, such as concentrate water, then the concentrate water may flow from the tubular body, through a pathway in the endplate, to exit the system through the connection to the concentrate water conduit. Similarly, no conduit extending from an outward facing surface 130 of first outer end plate and an outward facing surface 132 of the second outer end plate provides fluid communication between the plurality of tubular bodies. No conduits extending from the end plates provide fluid communication between two or more tubular bodies. As shown in the prior art, external conduits are typically used to connect an inward facing surface of an end plate to an outward facing surface of a second endplate. This invention improves over the prior art by eliminating the need for such external conduits and allows water to flow between the tubular bodies through the end plates rather than through external conduits.

It is understood that, in certain embodiments, the channels or pathways may traverse through the end plate and have an opening on an outward facing side of the end plate. For example, the system may include a channel having an opening on the outward facing surface of the endplate defining an egress, where the egress may have a means of attachment to at least one of the feed water conduit, the permeate water conduit, and the concentrate water conduit. Additionally, the end plates may include channels or pathways that do not provide fluid communication within the system, where such pathways are dry and/or water tight to provide a pathway for electrical components (such as wires for sensors for example) and/or mechanical components (such as screws or other fasteners). Other pathways may be used that are within the spirit and scope of the present invention.

Figure 2:
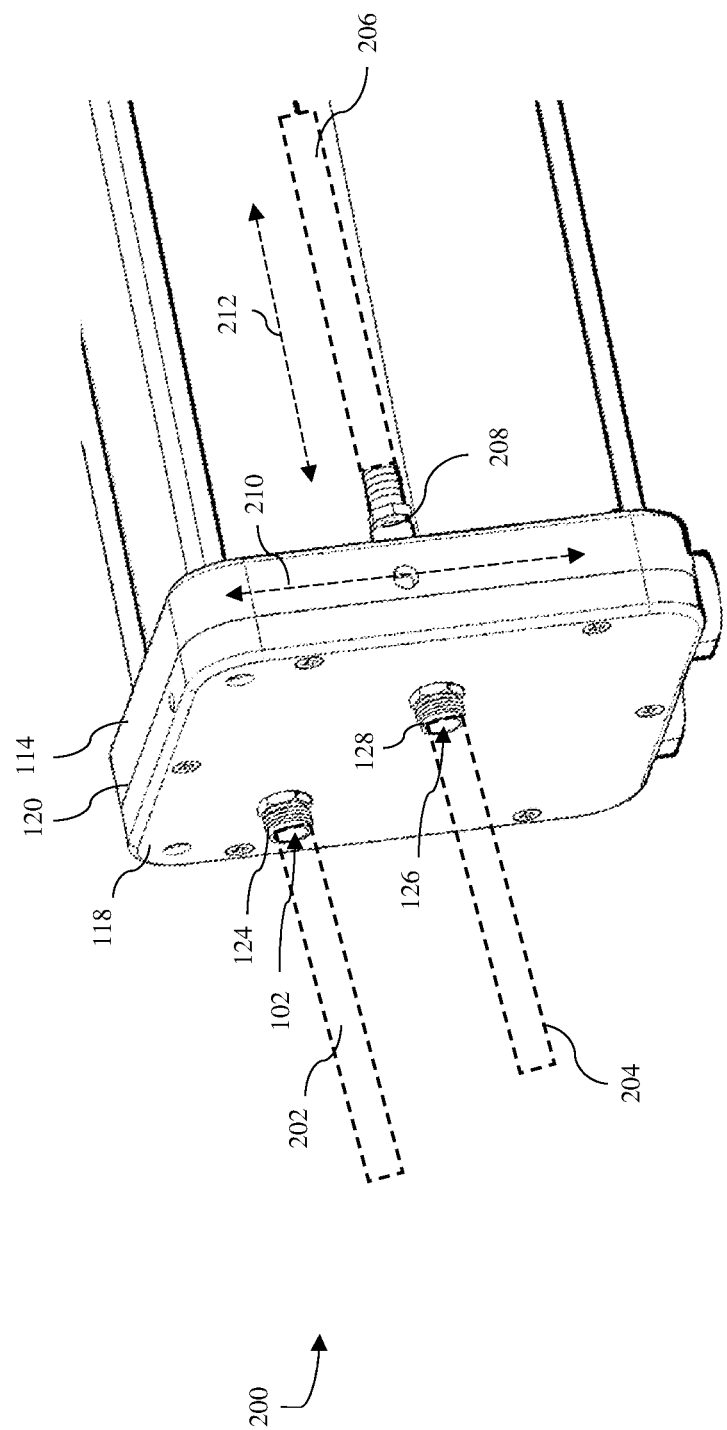
FIG. 2 is a side perspective view of the reverse osmosis system to be connected to a feed water conduit and producing permeate water, according to an example embodiment.

Referring now to FIG. 2, a side perspective view of a portion 200 of the reverse osmosis system to be connected to the feed water conduit 202 and producing permeate water is shown, according to an example embodiment. The first outer end plate 118 abuts the outer surface (805 in FIG. 8) of the first inner end plate 114 at the abutting section 120. The channels span within the inner end plate. Additionally shown in FIG. 4, the longitudinal axis 210 and the second longitudinal axis 212 are relatively perpendicular to each other. The feed water conduit 202 is connected to the feed water ingress attachment 124 to provide fluid communication with the ingress pass-through opening. The feed water ingress attachment 124 is connected to the ingress pass through opening 102. The feed water attachment is configured to be connected to the feed water conduit 202. The feed water conduit is attached to an external source of water that may be unfiltered. The feed water conduit transfers water from the external source of water to the ingress pass through opening, thereby providing water to the first tubular body. Similarly, a permeate water egress conduit 204 is connected to a permeate water egress attachment 128 to provide fluid communication with the permeate water egress pass-through opening 126. Permeate water exits the reverse osmosis system through the permeate water egress opening 126, which is connected to an permeate water egress attachment 128. The permeate water attachment is configured to connect to a permeate water conduit that transfers permeate water out of the system 100. A concentrate water conduit 206 is in fluid communication with a concentrate water egress channel (515 in FIG. 5) within the first inner plate via a concentrate water egress attachment 208. Concentrate water is the remaining high solute or unclean water after the permeate water passes through a reverse osmosis membrane. The concentrate water is either removed from the system through the concentrate water egress or is recycled back into the system to be filtered again.

The conduits may be comprised of metallic material such as carbon steel, stainless steel, aluminum, Titanium, other metals or alloys, composites, ceramics, polymeric materials such as polycarbonates, such as Acrylonitrile butadiene styrene (ABS plastic), Lexan™, and Makrolon™, or other materials having waterproof type properties. The conduits may be made of other materials and is within the spirit and of the disclosure. The conduits may be formed from a single piece or from several individual pieces joined or coupled together. The components of the conduits may be manufactured from a variety of different processes including an extrusion process, a mold, casting, welding, shearing, punching, folding, 3D printing, CNC machining, etc. However, other types of processes may also be used and are within the spirit and scope of the present invention.

Figure 3:
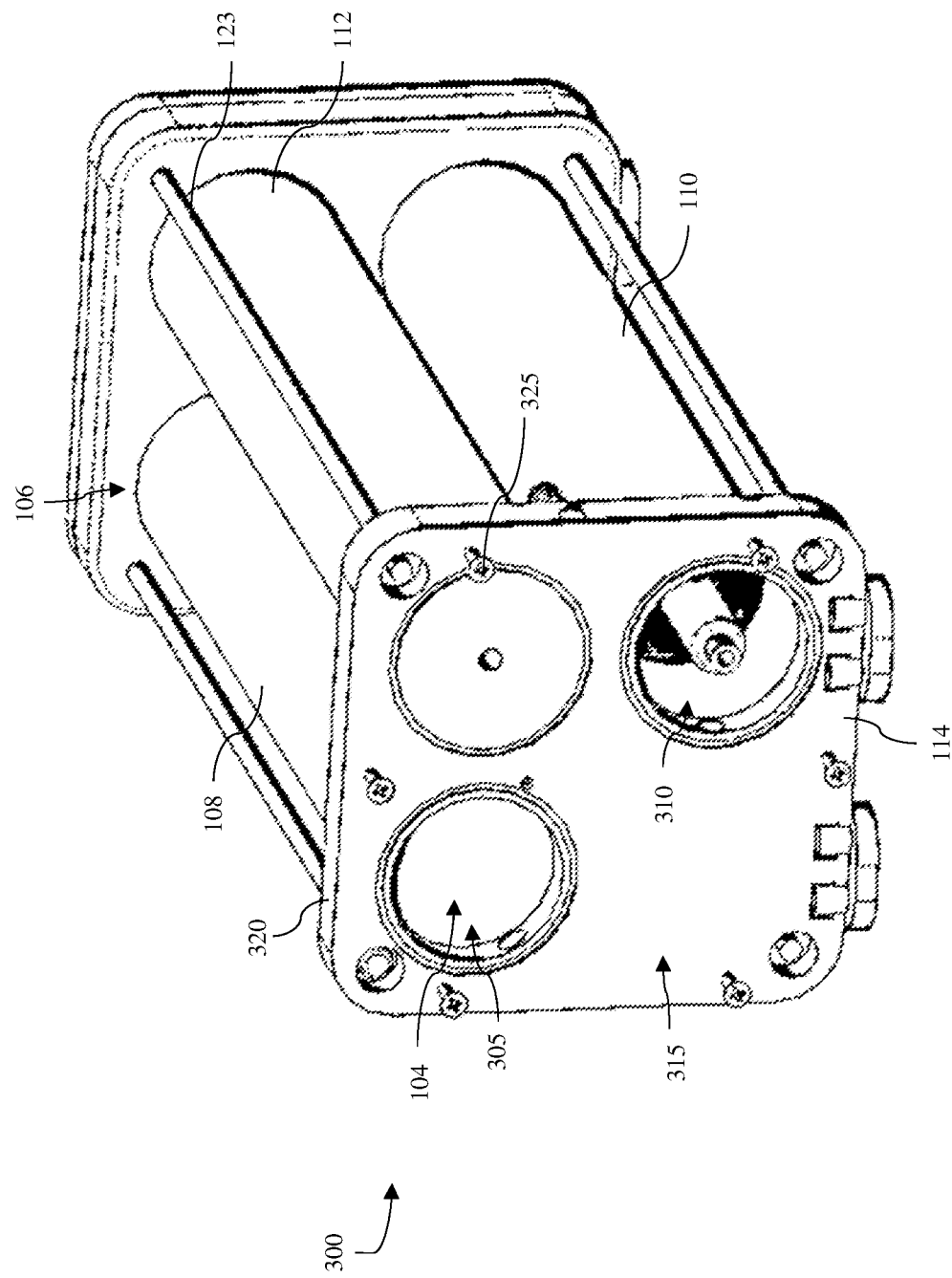
FIG. 3 is a front perspective view of the reverse osmosis system having an outer end plate removed, according to an example embodiment.

Referring now to FIG. 3, a front perspective view of a reverse osmosis system 300 with the outer plate removed is shown, according to an example embodiment. The first inner end plate 114 provides access to the first tubular body 108 and the third tubular body 110 of the plurality of tubular bodies. An inner end plate pass-through opening 305 is disposed on the first inner end plate such that the inner end plate pass-through opening is concentric with and in fluid communication with either the first end 104 or second end 106 of the first tubular body. The inner end plate pass-through opening 305 provides access to the first tubular body 108. The access allows for a user to remove the water filter within the first tubular body to be fixed, cleaned, and/or or replaced. The first inner end plate includes another opening 310 for access to the third tubular body 110.

Figure 6:
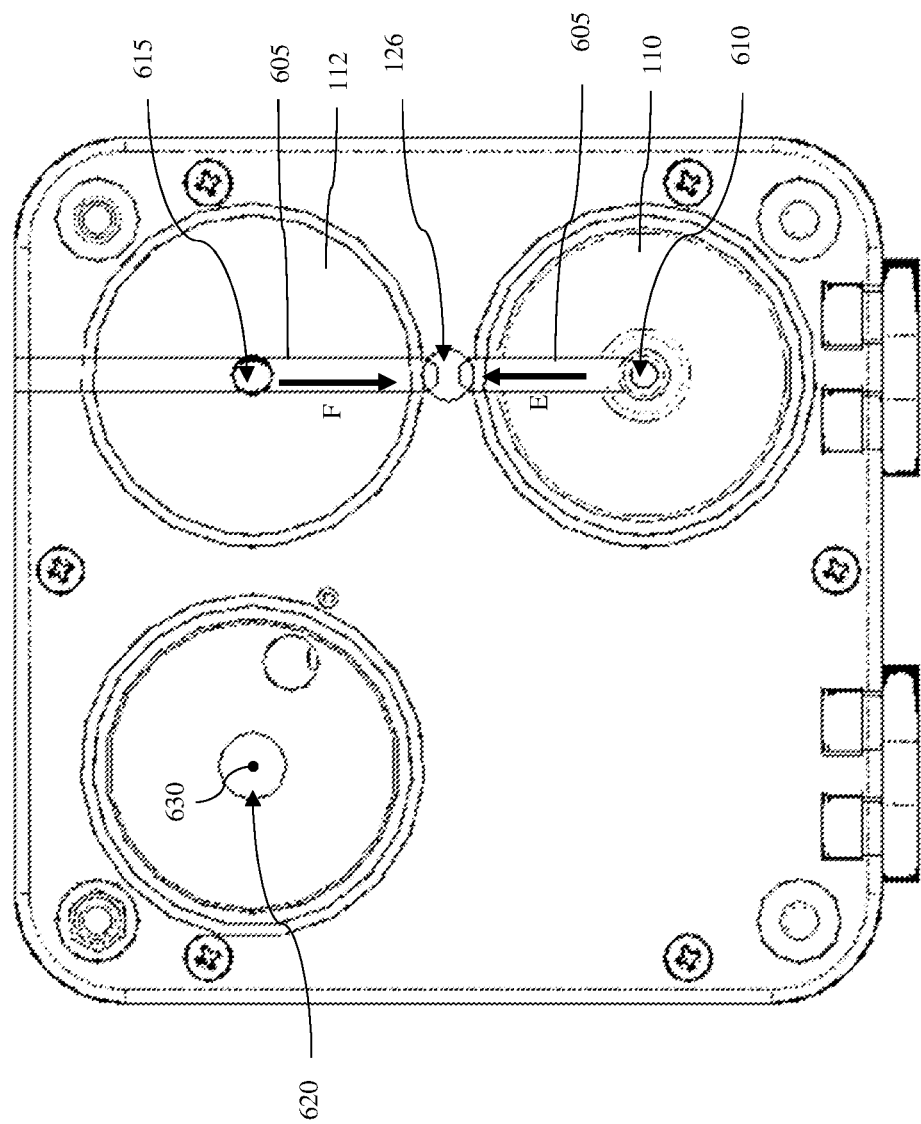
FIG. 6 is a front view of the reverse osmosis system to be connected to a feed water conduit and producing permeate water, illustrating certain channels within the outer end plate, according to an example embodiment.

With reference now to FIG. 4 through FIG. 6, the channels, or conduits, that connect the plurality of tubular bodies are illustrated, according to an example embodiment. The conduits provide a pathway for waterflow between the tubular bodies and are configured to connect the tubular bodies in series. The conduits traverse within the inner end plates so that the tubular bodies can be positioned proximate to each other within the hold of the inner end plates. In the prior art, the stages of a reverse osmosis system are positioned side by side such that the system is wide or long. However, the present disclosure allows the stages to be positioned close to each other because the inner end plates provide fluid communication for the tubular bodies. The conduits connecting the tubular bodies are within the inner end plates and traverse perpendicularly to the tubular bodies. These conduits do not extrude from the tubular bodies, so the system is more compact than the prior art. The compactness of the system 100 also allows for increased portability over the prior art. Because the system only has two attachments that allow for an external conduit for feed water and a second external conduit for permeate water, a user may travel with the system 100 and move the compact system to other positions.

Referring now to FIG. 4, a back perspective view of a reverse osmosis system 400 with the second outer end plate removed is shown, according to an example embodiment. In FIG. 4, the second inner end plate 116 is transparent to illustrate the channels within the second inner end plate. The second inner end plate includes a tubular opening 405 for the fourth tubular body 112 including the second reverse osmosis membrane. The tubular opening 405 allows a user to access the second reverse osmosis membrane. The second inner end plate includes the first channel 410 and the third channel 415. After the feed water moves through the first tubular body from direction A, the water flows within the first channel from the first tubular body 108 to the second tubular body 420. In one example embodiment, the first channel is connected to a sensor channel 435 that leads to a sensor 440 for data readings such as pressure and temperature. However, it is understood that other sensor channels and sensor may be included within the spirit and scope of the present invention. On important feature of the sensor channels would be that there are no conduits that act as channels providing fluid communication between the tubular bodies that would extend beyond the outer surfaces of the outer endplates and inner endplates. Because the bottom end 430 of the third channel 415 is blocked off or closed, the third channel allows concentrate water from the first reverse osmosis membrane in the third tubular body 110 to flow in direction D to the second reverse osmosis membrane in the fourth tubular body 112.

Referring now to FIG. 5, a front view of a reverse osmosis system 500 with the first outer end plate removed is shown, according to an example embodiment. In FIG. 5, the first inner end plate 114 is transparent to illustrate the second channel 505, the fourth channel 510, and a concentrate water egress channel 515 within the first inner end plate. The second channel provides a pathway to move water from the second tubular body 420 to the third tubular body 110 that includes the first reverse osmosis membrane. After the pump moves the filtered water towards the first inner end plate, the filtered water flows in direction C through the second channel to enter the third tubular body. The end 530 of the second channel is at the edge of the first inner end plate. The fourth channel provides a pathway to recycle the water from the fourth tubular body. The fourth channel 510 leads water into the first tubular body. The end 525 of the fourth channel is at the edge of the first inner end plate. The first inner end plate may also include a pathway 511 that leads water to the second tubular body 420. The first inner end plate also includes the concentrate water egress channel 515 that leads to the concentrate water egress opening 520 disposed on the inner surface (825 in FIG. 8) of the first inner end plate.

Figure 7:
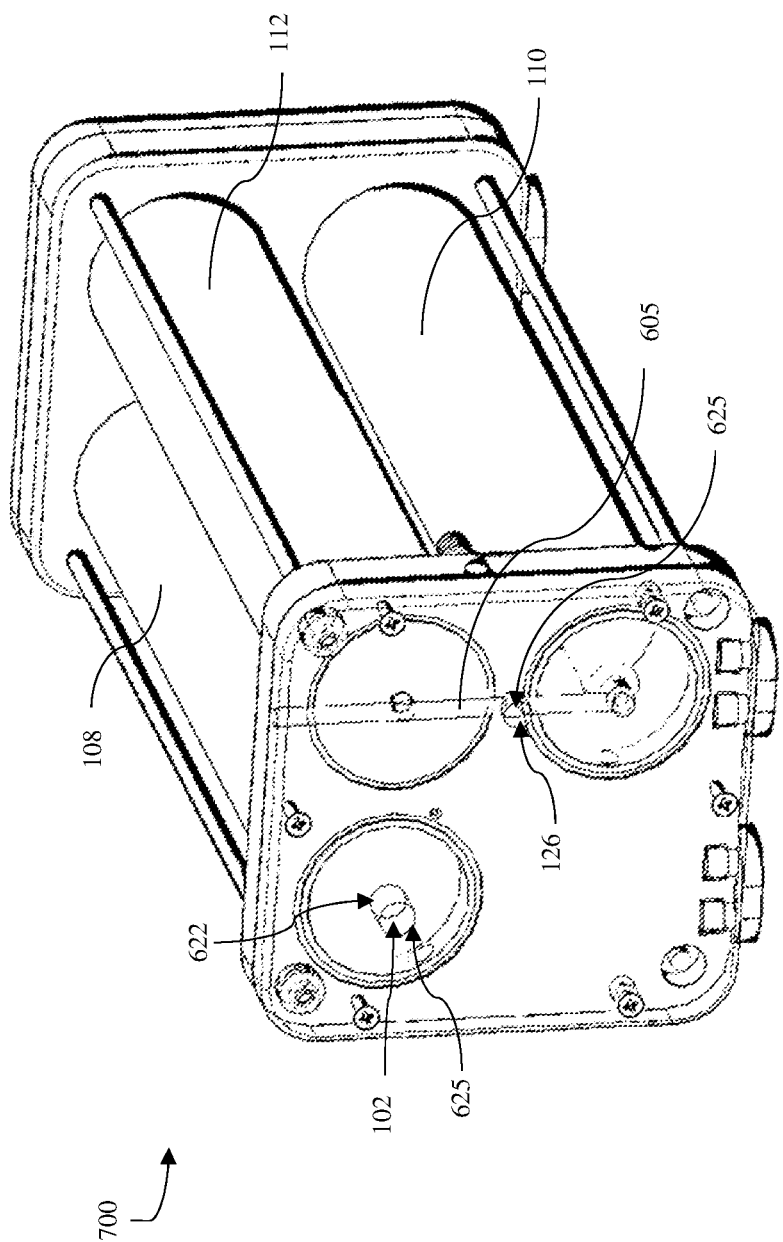
FIG. 7 is a front perspective view of the reverse osmosis system to be connected to a feed water conduit and producing permeate water, illustrating certain channels within the outer end plate, according to an example embodiment.

Referring now to FIG. 6 and FIG. 7, views of the reverse osmosis system 100 with the first outer end plate removed is shown, according to an example embodiment. FIG. 6 is a front view of the reverse osmosis system 600 while FIG. 7 is a front perspective view of the reverse osmosis system 700. FIG. 6 and FIG. 7 illustrates the fifth channel 605 within the first outer end plate 118. The fifth channel is bored within the first outer end plate and provides fluid communication between a permeate water outlet 610 of the first reverse osmosis membrane disposed within the third tubular body 110 and a second permeate water outlet 615 of the second reverse osmosis membrane disposed within the fourth tubular body 112. The permeate water outlet is a permeate water opening on the third tubular body that includes the first reverse osmosis membrane. The second permeate water outlet is a second permeate water opening on the fourth tubular body that includes the second reverse osmosis membrane. The fifth channel flows permeate water in directions E and F such that the permeate water leads to the permeate water egress opening 126 that is in fluid communicant with the permeate water conduit (204 in FIG. 2). The inner end plate also includes the ingress pass-through opening 102 that includes the inner end plate pass-through opening 622 and the outer end plate pass-through opening 625. The inner end plate pass through opening and the outer end plate pass through opening are concentric such that the inner end plate pass through opening and the outer end plate pass through opening share the same center point 630. The ingress pass through opening provides a channel to provide fluid communication between the feed water conduit and the first tubular body.

Figure 8:
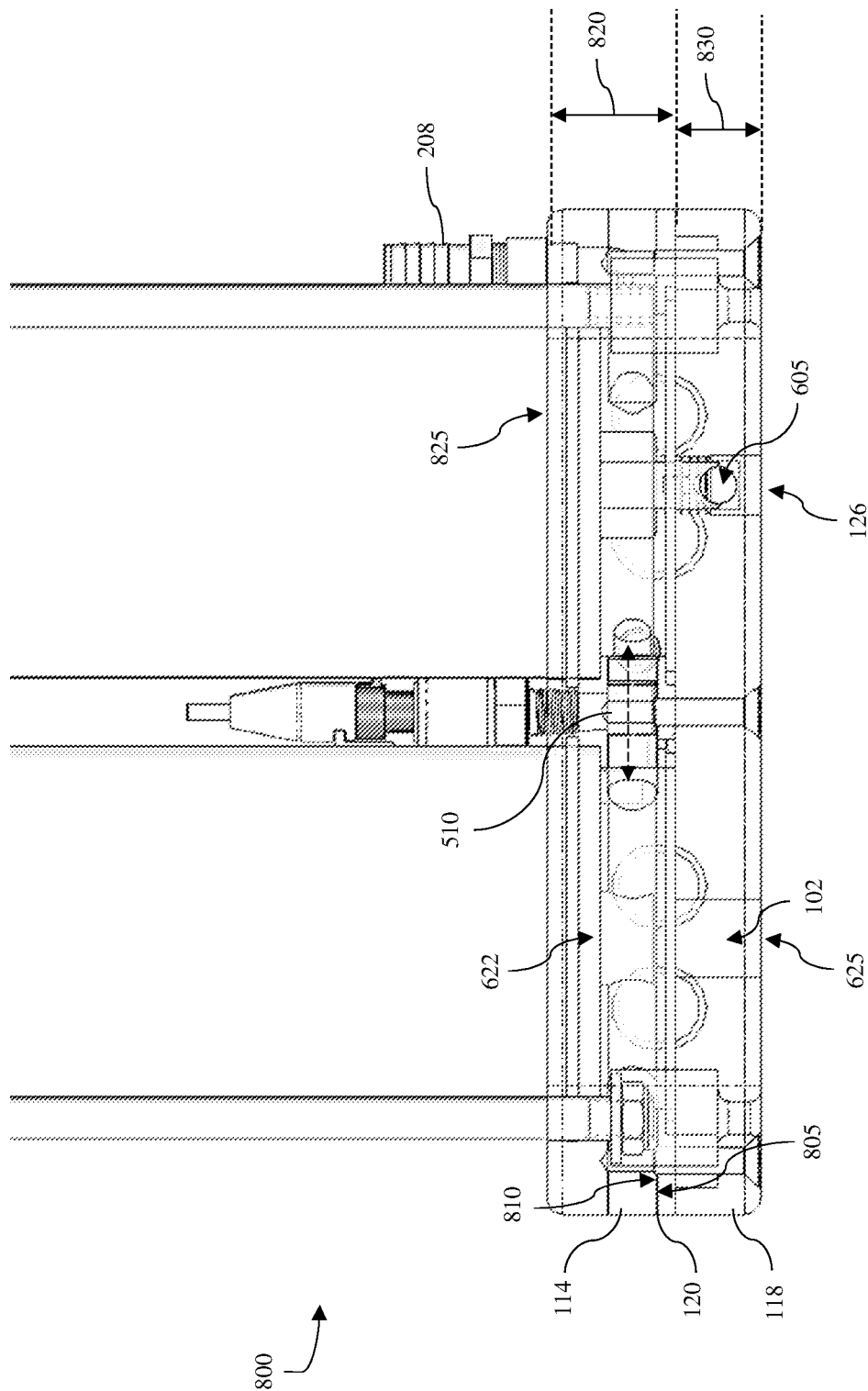
FIG. 8 is a top perspective view of the reverse osmosis system to be connected to a feed water conduit and producing permeate water illustrating certain channels within the inner end plate and outer end plate, according to an example embodiment.

Referring to FIG. 8, a top view of a portion 800 of the system 100 illustrating the first inner end plate 114 and the first outer end plate 118 is shown, according to an example embodiment. The outer surface 805 of the first inner end plate abuts the inner surface 805 of the outer end plate at the abutting section 120. The outer end plate is flush with the inner end plate such that the combination of the two looks like one plate. The fifth channel 605 is connected to the permeate water egress pass through opening 126 to allow the permeate water to leave the system. The concentrate water egress attachment 208 is disposed on the inner surface 825 of the first inner end plate.

Referring now to FIG. 9, a diagram 900 illustrating the waterflow in the reverse osmosis system is shown, according to an example embodiment. The flow of water within the system begins with the feed water conduit (202 in FIG. 2) and into the feed water ingress. In direction A, the water enters the first tubular body including the filter 905 and exits as filtered water into the first channel (410 in FIG. 4) within the first inner end plate. The filtered water then flows in direction B into the water pump 910 housed in the second tubular body. The water pump pushes the filtered water towards the second channel within the second inner end plate. The second channel leads the filtered water in direction C into the first reverse osmosis membrane 915 within the third tubular body (110 in FIG. 5).

After the filtered water passes through the first reverse osmosis membrane, the filtered water divides into permeate water and concentrate water. The permeate water flows through the fifth channel (605 in FIG. 6) while the concentrate water flows through the third channel. The third channel leads the concentrate water in direction D towards the fourth tubular body (112 in FIG. 4) that includes the second reverse osmosis membrane 920. The fifth channel leads the permeate water in direction E towards the permeate water egress opening (126 in FIG. 6) to be released into the permeate water conduit. After the concentrate water passes through the second reverse osmosis membrane, the concentrate water divides into permeate water and concentrate water. The permeate water flows in direction F through the fifth channel (605 in FIG. 6) and towards the permeate water egress opening. Shown in FIG. 5, the second reverse osmosis membrane also produces concentrate water that flows through at least one of the fourth channel 510 in direction G1, or the alternative pathway 511 in direction G2. Shown in FIG. 5, in direction G1, the concentrate water flows back to first tubular body 108 holding the water filter, and, in direction G2, the concentrate water flows to the second tubular body 420 holding the water pump. The fourth channel allows the concentrate water to be recycled to go through the system 100 to become filtered again. Alternatively, excess concentrate water may flow in direction H through the concentrate water egress channel (515 in FIG. 5) to leave through the concentrate water opening and flow into the concentrate water egress (206 in FIG. 2).

The system may include a plurality of sensors 902 configured to detect data and/or measurements of water flow, water level and/or volume, temperature, pressure, and/or total dissolved solids ("TDS"). However, the sensor may be used to measure other types of measurements which may be used within spirit and scope of the present invention. The plurality of sensors may comprise active sensors, which rely on power sources or external sources, and/or passive sensors which directly give an output signal to the processor that corresponds to its measured input. The plurality of sensors may include temperature sensors, liquid flow sensors, infrared sensors, pressure sensors, force sensors, touch sensitive sensors, ultraviolet and photostability sensors, motion and velocity sensors, temperature sensors, proximity sensors, and/or light sensors. Other sensors may be used and are within the spirit and scope of the present invention.

The sensors send the data that it measures at certain steps in the process flow of the system to a processor 925, such as pressure or water flow within a channel and/or pathway. The processor is configured to receive and transmit signals and data from the sensors into readable information. The processor can determine the points of failure, if any, within the system and transmit the information to the user so that the user may make repair and maintenance decisions based on the information. Additionally, the processor can determine that the components of the system are functioning efficiently and indicate that no repair or maintenance is required.

For example, a sensor that is detecting the measurements of the first tubular body may send a signal, indicating a water pressure outside a preferred range, to the processor. The processor translates that signal to the user via a display or alarm so that the user is prompted to remove the first outer end plate to inspect the first tubular body. The sensors are used to monitor the system to identify points of failure and/or sections of the system that require repair or maintenance. By eliminating external conduits between the tubular bodies, repair and maintenance of the system is more efficient and timelier. This may also reduce repair costs and eliminate additional replacement parts. To maintain the system, a user need only to remove the outer end plate to access the components of the system rather than disengage external conduits and disassemble the system in its entirety.

The system may also include a power source 930 in communication with the sensors, the processor, and the water pump. In the present embodiment, the power source may be a battery power source, such as a standard dry cell battery commonly used in low-drain portable electronic devices (i.e., AAA batteries, AA batteries, etc.). Other types of batteries may be used including rechargeable batteries, aluminum air batteries, lithium batteries, paper batteries, lithium-ion polymer batteries, lithium iron phosphate batteries, magnesium iron batteries etc. Additionally, other types of battery applications may be used and are within the spirit and scope of the present invention. For example, a battery stripper pack may also be used. Additionally, other types of power sources may also be used and are within the spirit and scope of the present invention. In other embodiments, the power source may be an external power source 935. For example, the system may include a power cable that can connect to an electrical wall outlet. Other types of external power sources may be used and are within the spirit and scope of the present invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A reverse osmosis system to be connected to a feed water conduit and producing permeate water, wherein permeate water exits the reverse osmosis system through a permeate water egress opening, the reverse osmosis system comprising:
   a. a plurality of tubular bodies each having a first end and a second end;
   b. a first inner end plate attached to the first end of the tubular bodies;
   c. a second inner end plate attached to the second end of the tubular bodies;
   d. a first outer end plate removably attached to and abutting an outer surface of the first inner end plate;

e. a second outer end plate removably attached to and abutting an outer surface of the second inner end plate;

f. an inner end plate pass-through opening, disposed on first inner end plate such that the inner end plate pass-through opening is concentric with and in fluid communication with either the first end or second end of a first tubular body of the plurality of tubular bodies;

g. a first channel within either the second inner end plate or second outer end plate; and h. wherein the first channel provides fluid communication between the first tubular body and a second tubular body of the plurality of tubular bodies.

2. A reverse osmosis system of claim 1, wherein no conduit extending exterior from the first outer plate and exterior from the second outer plate provides fluid communication between the plurality of tubular bodies.

3. A reverse osmosis system of claim 1, wherein no conduit extending exterior from first inner end plate and exterior from the second inner end plate provides fluid communication between the plurality of tubular bodies.

4. The reverse osmosis system of claim 1 further comprising at least one rod connecting the first inner end plate to the second inner end plate.

5. The reverse osmosis system of claim 1 wherein the plurality of tubular bodies houses a filter, a pump, and two reverse osmosis membranes therein.

6. The reverse osmosis system of claim 1, wherein the plurality of tubular bodies is configured to be connected in series and to be in fluid communication with each other.

7. A reverse osmosis system to be connected to a feed water conduit and producing permeate water, wherein permeate water exits the reverse osmosis system through a permeate water egress opening, the reverse osmosis system comprising:

a. a plurality of tubular bodies each having a first end and a second end;

b. a first inner end plate attached to the first end of the plurality of tubular bodies;

c. a second inner end plate attached to the second end of the plurality of tubular bodies;

d. a first outer end plate removably attached to and abutting an outer surface of the first inner end plate;

e. a second outer end plate removably attached to and abutting an outer surface of the second inner end plate;

f. an ingress pass-through opening, disposed on the first outer end plate and the first inner end plate, configured to be connected to the feed water conduit, and in fluid communication with the first end a water filter disposed within a first tubular body of the plurality of tubular bodies;

g. wherein the ingress pass-through opening on the first inner end plate has a diameter sized such that a component within a respective tubular shaped body may be maintained;

h. a first channel, bored within the second inner end plate, providing fluid communication between the water filter disposed the first tubular body and a water pump disposed within a second tubular body of the plurality of tubular bodies;

i. a second channel, bored within the first inner end plate, providing fluid communication between the water pump disposed within the second tubular body and a first reverse osmosis membrane disposed within a third tubular body of the plurality of tubular bodies;

j. a third channel, bored within the second inner end plate, providing fluid communication between the first reverse osmosis membrane disposed within the third tubular body and a second reverse osmosis membrane disposed within a fourth tubular body of the plurality of tubular bodies;

k. a permeate water egress pass-through opening, bored on the first inner end plate and extending through the first outer end plate, and configured to be connected to a permeate water pass through egress conduit; and l. Wherein no conduit extending exterior from the first outer plate and exterior from the second outer plate provides fluid communication between the plurality of tubular bodies.

8. A reverse osmosis system of claim 7, wherein no conduit extending exterior from the first outer end plate and exterior from the second outer end plate provides fluid communication between the plurality of tubular bodies.

9. A reverse osmosis system of claim 8, wherein no conduit extending exterior from the first inner end plate and exterior from the second inner end plate provides fluid communication between the plurality of tubular bodies.

10. The reverse osmosis system of claim 9, wherein the feed water conduit is connected and in fluid communication with the ingress pass-through opening and a permeate water egress conduit is connected to and in fluid communication with the permeate water egress pass-through opening.

11. The reverse osmosis system of claim 10, wherein a fourth channel is bored within the first inner end plate and provides fluid communication between the second reverse osmosis membrane disposed within the fourth tubular body and either (a) the water filter disposed within the first tubular body and either (b) a pump disposed with the second tubular body.

12. The reverse osmosis system of claim 11 further comprising a fifth channel bored within the first outer end plate and providing fluid communication between a permeate water outlet of the first reverse osmosis membrane and a permeate water outlet of the second reverse osmosis membrane disposed within the third tubular body.

13. The reverse osmosis system of claim 12 further comprising at least one rod connecting the first inner end plate to the second inner end plate.

14. A reverse osmosis system to be connected to a feed water conduit and producing permeate water, wherein permeate water exits the reverse osmosis system through a permeate water egress opening:

a. a plurality of tubular bodies each having a first end and a second end;

b. a first inner end plate attached to the first end of the plurality of tubular bodies;

c. a second inner end plate attached to the second end of the plurality of tubular bodies;

d. an inner end plate pass-through opening disposed on the first inner end plate such that the inner end plate pass-through opening is concentric with and in fluid communication with either the first end or the second end of a first tubular body of the plurality of tubular bodies e. a first channel within the second inner end plate, wherein the first channel provides fluid communication between the first tubular body and a second tubular body of the plurality of tubular bodies; and f. wherein no conduit extending exterior from the first inner end plate and exterior from the second inner end plate provides fluid communication between the plurality of tubular bodies.

15. The reverse osmosis system of claim 14, wherein the first channel is bored substantially perpendicular relative to the plurality of tubular bodies.

16. The reverse osmosis system of claim 14 further comprising:
   a. a first outer end plate removably attached to and abutting an outer surface of the first inner end plate;
   b. a second outer end plate removably attached to and abutting an outer surface of the second inner end plate; and
   c. wherein no conduit extending exterior from the first outer end plate and exterior from the second outer end plate provides fluid communication between the plurality of tubular bodies.

17. The reverse osmosis system of claim 16 further comprising:
   a. a second channel bored within the first inner end plate providing fluid communication between a water pump disposed within the second tubular body and a first reverse osmosis membrane disposed within a third tubular body of the plurality of tubular bodies;
   b. a third channel bored within the second inner end plate providing fluid communication between the first reverse osmosis membrane disposed within the third tubular body and a second reverse osmosis membrane disposed within a fourth tubular body of the plurality of tubular bodies;
   c. a fourth channel, bored within the first inner end plate and provides fluid communication between the second reverse osmosis membrane disposed within the fourth tubular body and a water filter disposed within the first tubular body; and
   d. a fifth channel, bored within the first outer end plate, providing fluid communication between a permeate water opening of the first reverse osmosis membrane, a second permeate water outlet of the second reverse osmosis membrane disposed within the third tubular body, and the permeate water egress opening.

18. The reverse osmosis system of claim 1, wherein the inner end plate pass-through opening has a diameter sized such that a component within a respective tubular shaped body may be maintained.

\* \* \* \* \*